United States Patent
Hubbs

[11] 3,813,143
[45] May 28, 1974

[54] REFLECTIVE DEER WARNING DEVICE

[76] Inventor: Kenneth R. Hubbs, Rt. 1, Gary, S. Dak. 57237

[22] Filed: Nov. 15, 1972

[21] Appl. No.: 306,520

[52] U.S. Cl. .......................... 350/97, 350/295, 404/9
[51] Int. Cl. .............................................. G02b 5/12
[58] Field of Search ........... 116/63 P, 63 R; 350/97, 350/288, 100, 104, 295; 404/9, 10–16

[56] References Cited
UNITED STATES PATENTS

| | | | |
|---|---|---|---|
| 1,250,064 | 12/1917 | Whims | 404/10 |
| 2,949,324 | 8/1960 | Birge | 404/10 |
| 2,991,699 | 7/1961 | Murray | 116/63 P |
| 3,374,447 | 4/1971 | Ruble | 350/295 |
| 3,610,738 | 10/1971 | Bochmann | 350/295 |
| 3,716,288 | 2/1973 | Kannenberg | 350/97 |

*Primary Examiner*—Ronald L. Wibert
*Assistant Examiner*—Michael J. Tokar
*Attorney, Agent, or Firm*—Merchant, Gould, Smith & Edell

[57] ABSTRACT

A light reflecting device for use adjacent highways and roadways to reflect the headlights of oncoming automobiles transversely away from the highway and thereby warn wild animals. The device includes a reflecting plate which is curvably bendable to distort light as it is reflected. Means are also included to variably bend the plate to control the light reflecting direction as well as the degree of distortion. The device is adapted for mounting on a fence post or the like in a position elevated sufficiently from the ground to be struck by such oncoming headlights.

12 Claims, 4 Drawing Figures

PATENTED MAY 28 1974 3,813,143

REFLECTIVE DEER WARNING DEVICE

The invention is related to devices for use along highways to reflect the headlights of oncoming automobiles away from the highway and thereby warn wild animals. It is well known that deer frequently cross highways and roadways, and, in so doing, create a hazard for automobiles traveling at higher speeds. The problem is particularly acute during night hours, because deer are often mesmerized by the steady movement of oncoming headlights. Rather than running away from the highway, a deer seeing headlights may remain on the highway and be hit by the car. On some occasions, deer have been known to actually run into vehicles as they have passed by. Notwithstanding the manner in which they occur, such collisions ordinarily injure and often kill the deer; and, at the very least, cause property damage to the vehicle.

A number of solutions have been proposed which would either solve the problem or reduce the number of deer-motor vehicle accidents. For example, deer warning devices have been utilized which are positioned adjacent a highway in such a manner as to reflect car headlights away from the road in an attempt to scare deer and prevent them from approaching the road at that time. However, as mentioned above, light in this form does not ordinarily cause the deer to react as expected, and on many occasions the effect is precisely the opposite.

An alternative solution to the problem has been the posting of warning signs along the highway, indicating to the motorist that he is driving through an area in which deer are likely to be crossing. This has not been an effective solution to the problem, since even concentrated observation by the motorist cannot preclude all accidents.

My invention is based on the discovery that, whereas deer do not become frightened or startled at night when subjected to the lights from a passing car or by such light reflected from a conventional mirror or the like, they do become startled when they encounter distorted light reflected from an irregular surface. Specifically, I have found that deer become startled and run away in the presence of light reflected from a curved mirror-like surface. I therefore provide a device for warning deer of an approaching vehicle, which is placed alongside a highway or roadway at a level permitting it to be struck by the headlights of a vehicle coming from either direction. The reflecting surface is disposed to reflect light transversely away from the highway, and it is curved so that the light is distorted as it is reflected. Due to movement of the vehicle, the distorted, reflected light also moves; and in the eyes of deer which may be nearby, this light apparently resembles the movement of a predator. The deer is therefore frightened and runs in a direction away from the highway.

In the preferred embodiment, I provide a reflecting surface formed from a flexible metal plate, and adjustable means for bowing or curving the metal plate to effect the desired light distortion and reflective direction. The device is adapted for mounting on a fence post or the like at the proper level.

The inventive device is extremely effective in preventing deer and other wild animals from crossing a highway as an automobile approaches and passes, notwithstanding its simplicity in design. The device thus offers a solution to the aforementioned problem which is not only successful but economical.

DESCRIPTION OF THE PREFERRED EMBODIMENT

Figure 1:
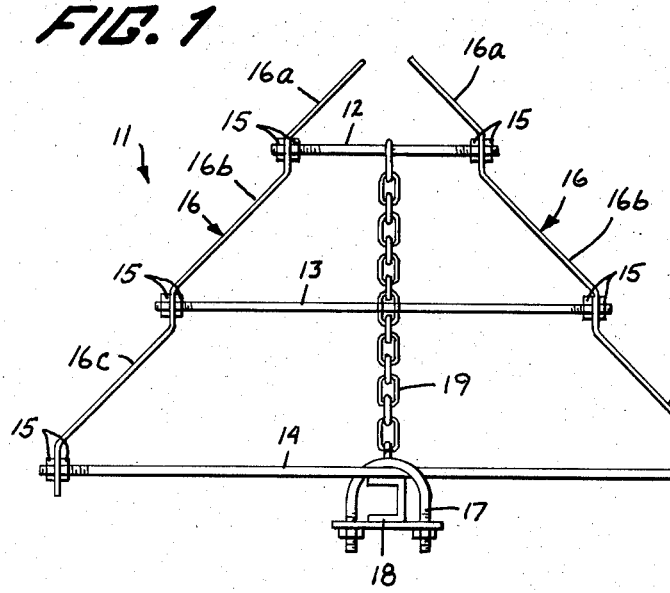
FIG. 1 is a view in top plan of a reflective device embodying the inventive principle.
Figure 2:
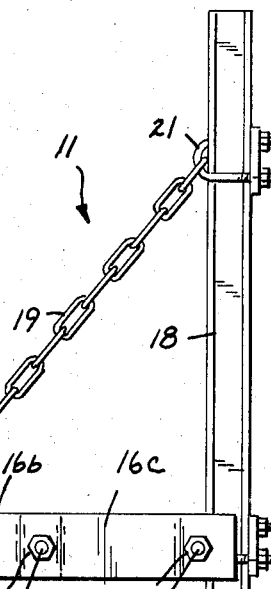
FIG. 2 is a view in side elevation of the reflective device in a mounted position.

With initial reference to FIGS. 1 and 2, a reflective device embodying the inventive principle is represented generally by the numeral 11. Device 11 includes a frame which, in the preferred embodiment, comprises three rods 12–14 of progressively increasing lengths. Each of the rods 12–14 is threaded at least at the end portions, each end being provided with a pair of nuts 15 as shown.

Each pair of nuts 15 is arranged to interlockably support and retain a portion of an elongated, flexible metal plate 16. Two such plates 16 are provided, and, due to the staggered length of the rods 12–14, the metal plates 16 are arranged in a V and angularly disposed approximately 90° from each other. Each of the metal strips 16 is stepped as shown and has apertures formed therein (not shown) to receive one end of each of the rods 12–14, the stepped portions defining planar, essentially parallel surfaces 16a–c. The outward facing surface of each of the metal plates 16 is plated to give it a mirror-like finish, thereby permitting it to reflect light as discussed in greater detail below. The inner face of each plate 16 is made essentially non-reflective, as by covering with flat black paint.

A U-bolt is loosely secured to the elongated rod 14, enabling the device 11 to be mounted to a fence post 18 or the like at a predetermined point thereon.

Device 11 further comprises two lengths of chain 19, 20 each having one end length connected to the shortest support rod 12. Each of the chain lengths 19, 20 carries at its free end a U-bolt, designated 21, 22, respectively, which are also adapted for supportive connection to the fence post 18.

Figure 3:
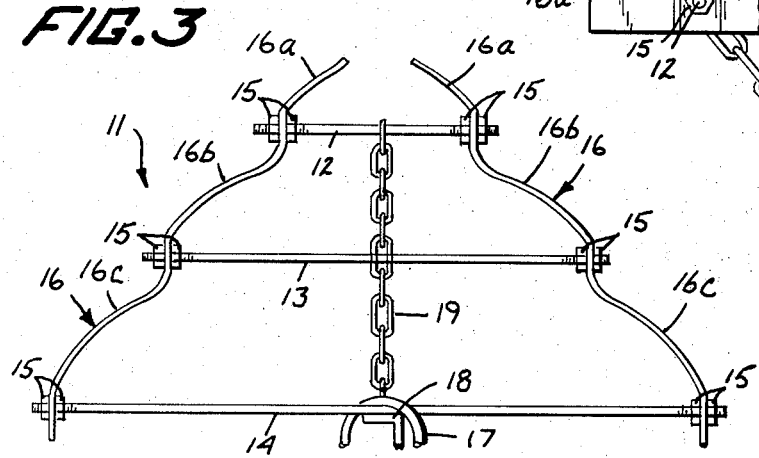
FIG. 3 is a view similar to that of FIG. 1, with the reflective device stressed to a desired operational mode.

The support offered to the device 11 by the chain lengths 19, 20 is, however, of secondary importance. Their primary function is to generate upon the rod 12 a tension force acting toward the fence post 18, which force serves to stress the respective metal plates 16. The effect of such stress is to curve the planar surfaces 16b and 16c as shown in FIG. 3. If desired, the metal plates 16 may be flexibly bent in order that the planar surfaces 16a will also be curved. These curved surfaces cause any light striking the surfaces to be reflectively distorted, which acts to startle deer that may be nearby in accordance with the phenomenon discussed above.

Figure 4:
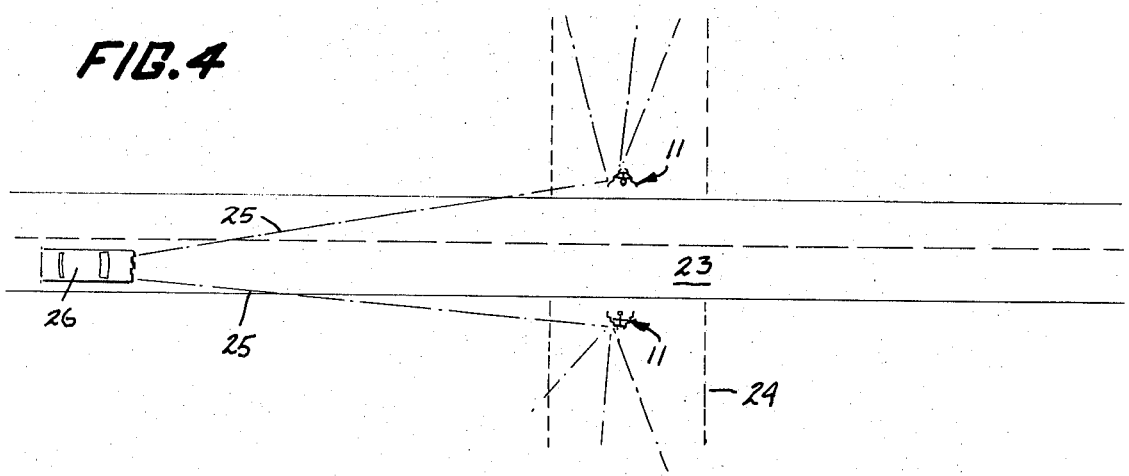
FIG. 4 is a diagrammatical representation of two reflective devices in use.

In operation, two such inventive devices 11 are used in the manner shown in FIG. 4. The devices are placed adjacent a highway 23 where it intersects a game trail represented by the numeral 24. Each of the devices is mounted on a fence post 18 or the like in a position elevated sufficiently above the ground to insure that the headlights 25 of an oncoming automobile 26 will strike the planar surfaces 16a–c. The metal plates 16 are oriented relative to the highway 23 so that the planar surfaces 16a–c will reflect light down the game trail 24 in each direction; i.e., transversely away from the highway 23. The U-bolts 21, 22 are then drawn tight to flexibly bend the metal plates 16 to distort the reflected light, and also to insure that the light travels down the game trail 24. It will be appreciated that, as mounted, the devices 11 will distortably reflect the headlights of an oncoming automobile from either direction on the highway 23. Since the headlights themselves are moving with oncoming movement of the car, the distorted, reflected light also moves; and to nearby deer the distorted moving light apparently resembles the movement of a predator. The effect, therefore, is to startle or frighten the deer, and thereby cause it to run away from the distorted light. In so doing, the deer also runs away from the highway, thereby eliminating the possibility of a mishap. The flat black inner surface of the metal plates 16 prevents reflection of the headlights back into the eyes of the automobile driver.

I claim:

1. A light reflecting device for use adjacent a motor vehicle roadway to reflect the headlights of an oncoming motor vehicle transversely away from the roadway and thereby warn nearby animals, the device comprising:
   a. frame means;
   b. means for mounting the frame means at a position elevated from the ground which permits the device to be struck by motor vehicle headlights;
   c. flexible plate means generally forming a V-shape, the outer surface of said V-shaped plate means being light reflective;
   d. the plate means being mounted on the frame means with said light reflective surface essentially vertically disposed to reflect light essentially horizontally away therefrom;
   e. and means cooperable with the frame means for variably flexing the plate means to reflectively distort light in a predetermined direction away from the roadway.

2. A light reflecting device for use adjacent a motor vehicle roadway to reflect the headlights of an oncoming motor vehicle transversely away from the roadway and thereby warn nearby animals, the device comprising:
   a. flexible plate means defining first and second legs essentially taking the form of a V, the flexible plate means having a light reflective outer surface and a non-reflective inner surface;
   b. frame means for carrying the flexible plate means with said outer surface essentially vertically disposed to reflect light horizontally away therefrom, said frame means comprising a plurality of rod members of progressively increasing length disposed between the legs of the plate means, the ends of each rod member being supportively secured to a portion of said first and second legs;
   c. means carried by the longest rod member for mounting the device at a position elevated from the ground which permits the device to be struck by motor vehicle headlights;
   d. and means for variably flexing the plate means to reflectively distort light in a predetermined direction away from the roadway, the plate flexing means comprising
      1. first and second elongated tension members each having one end connected to the shortest rod member;
      2. and connector means associated with the opposite ends of the tension members for placing said members under variable tension to flexibly curve the plate means.

3. The device defined by claim 2, wherein the flexible plate means comprises first and second elongated flexible plates.

4. The device defined by claim 3, wherein the ends of each of said rod members are threaded, each threaded end passing through an aperture formed in the associated flexible plate and carrying a pair of nuts disposed on opposite sides of the associated flexible plate to secure the plate to the rod.

5. The device defined by claim 2, wherein the mounting means comprises a U-bolt connected to said longest rod member, and the connector means comprises a U-bolt connected to the end of the associated tension member.

6. The device defined by claim 1, wherein the mounting means is constructed and arranged for adjustably securing the frame means to an upright fence post or the like.

7. The device defined by claim 1, wherein the plate means comprises first and second fleixble plates carried by the frame in said V-shape.

8. The device defined by claim 7, wherein the inner surface of the first and second plates are essentially non-reflective.

9. The device defined by claim 1, wherein the frame means comprises a plurality of elongated support members of progressively increasing length disposed between the plates, the ends of each elongated member respectively supporting a portion of the first and second plates.

10. The device defined by claim 9, wherein:
   a. the plate flexing means comprises first and second elongated tension members each having one end operatively connected to the shortest support member;
   b. and further comprising connector means associated with the opposite ends of the tension members for placing said members under variable tension to flexibly curve the first and second plates.

11. The device as defined by claim 10, wherein:
   a. the frame mounting means comprises a U-bolt operatively connected to the longest support member;
   b. and the connector means comprises a U-bolt operatively connected to the end of the associated tension member.

12. The device defined by claim 10, wherein each tension member comprises a length of chain.

* * * * *